US 8,204,557 B1

(12) United States Patent
Mota Veiga et al.

(10) Patent No.: US 8,204,557 B1
(45) Date of Patent: Jun. 19, 2012

(54) WIRELESS COMMUNICATIONS DEVICE ASSEMBLY

(75) Inventors: Daniel Mota Veiga, San Clemente, CA (US); Michael A. Gailloux, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 699 days.

(21) Appl. No.: 12/180,627

(22) Filed: Jul. 28, 2008

(51) Int. Cl.
*H04M 1/02* (2006.01)

(52) U.S. Cl. ............... 455/575.1; 361/680; 29/592.1

(58) Field of Classification Search ............ 455/575.1, 455/575.4, 90.3, 347, 348, 350, 574; 29/592.1; 361/680, 724
See application file for complete search history.

(56) References Cited

U.S. PATENT DOCUMENTS

| 5,956,625 | A | * | 9/1999 | Hansen et al. | 455/575.4 |
| 7,450,968 | B2 | * | 11/2008 | Jung | 455/566 |
| 2003/0064688 | A1 | * | 4/2003 | Mizuta et al. | 455/90 |
| 2004/0097276 | A1 | * | 5/2004 | Harmon | 455/575.1 |
| 2005/0054397 | A1 | * | 3/2005 | Kim et al. | 455/575.4 |
| 2008/0132303 | A1 | * | 6/2008 | Naukkarinen et al. | 455/575.4 |
| 2008/0311963 | A1 | * | 12/2008 | Strawn | 455/575.1 |
| 2009/0061956 | A1 | * | 3/2009 | Matsuoka | 455/575.1 |
| 2009/0137294 | A1 | * | 5/2009 | Chen | 455/575.4 |
| 2009/0203398 | A1 | * | 8/2009 | Griffin | 455/556.1 |

* cited by examiner

Primary Examiner — Kamran Afshar
Assistant Examiner — Khawar Iqbal

(57) ABSTRACT

A method and system are provided for assembling a monolith wireless mobile device in a manner that provides users with a highly fashionable and comfortable device while reducing associated manufacturing costs through a simpler assembly technique. The wireless mobile device utilizes a main housing having a plurality of generally channel-shaped sidewalls, each having one or more locking tabs for engagement with respective slots in an inner core. The sidewalls of the main housing each have a surface free of parting lines. The inner core, which is locked into the main housing, contains the hardware and software components of the wireless mobile device.

19 Claims, 3 Drawing Sheets

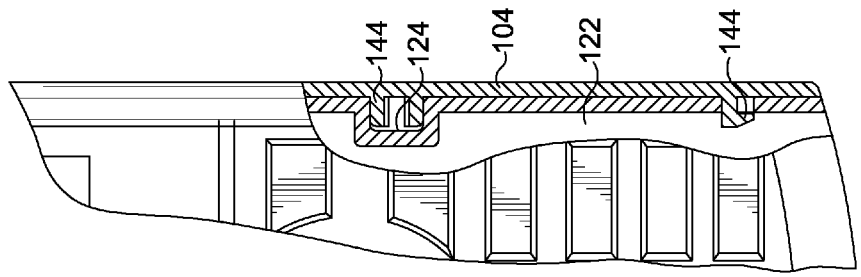
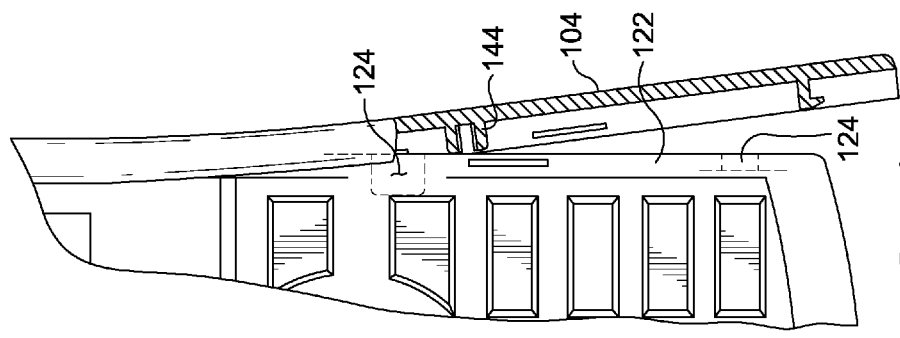
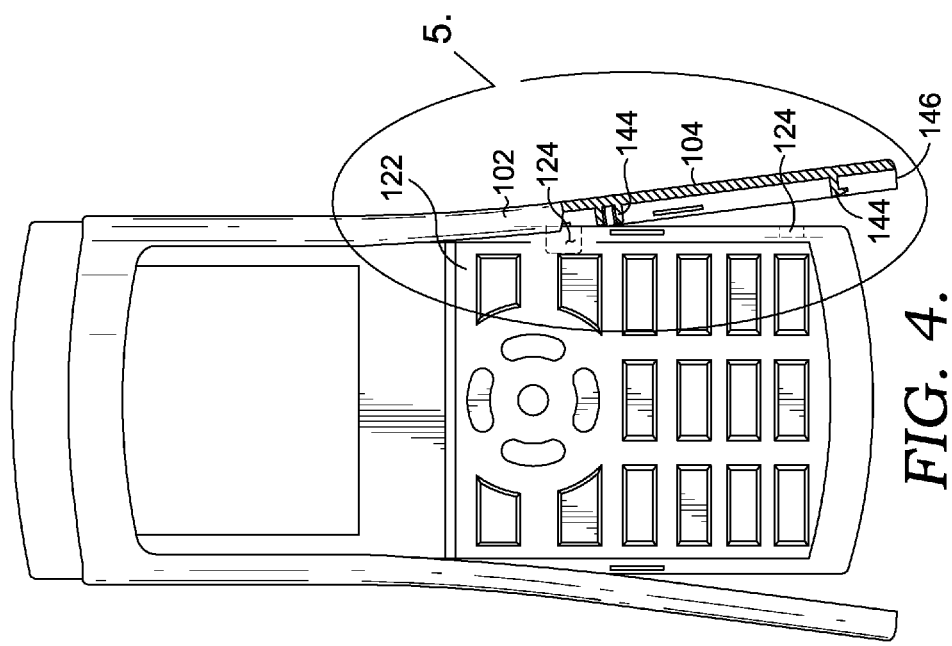

WIRELESS COMMUNICATIONS DEVICE ASSEMBLY

SUMMARY

Embodiments of the invention are defined by the claims below, not this summary. A high-level overview of embodiments of the invention are provided here for that reason, to provide an overview of the disclosure.

In a first aspect, a wireless mobile device is provided comprising a main housing, an inner core having one or more slots for slidably engaging the main housing, one or more areas for receiving a display lens, a keypad, and a navigation wheel, and a door positioned opposite the one or more areas. The main housing has first and second generally channel-shaped sidewalls that extend a length and are connected by a first and second connecting members. The sidewalls and connecting members form an opening at a first end of the main housing. The use of chanel-shaped sidewalls in the main housing eliminates parting lines and small assembly screws that are traditionally found in sandwich-style electronic device assemblies.

In a second aspect, a housing component of a wireless mobile device is provided having first and second generally channel-shaped sidewalls extending a length and being generally parallel. A first connecting member and second connecting member extend between the sidewalls to join the first and second sidewalls. The connecting members are spaced a distance apart and each have a connecting length. The sidewalls and connecting members are joined together to form an opening at a first end of the housing. The first and second generally channel-shaped sidewalls each have one or more locking tabs for securing the housing to a respective one or more slots of an inner core component of a wireless mobile device.

In a third aspect, a method of assembling a wireless mobile device is disclosed in which an inner core assembly is provided, the inner core assembly having one or more hardware and software components for operation of the wireless mobile device. The inner core assembly is directed through an opening in a first end of the main housing and slid within the main housing and towards a second end. The inner core assembly is then locked into the main housing. One such manner for accomplishing this is through one or more locking tabs located along sidewalls of the main housing engaging a respective one or more slots in the inner core assembly. Once the inner core assembly is locked within the main housing, other peripheral components, such as a display lens, a keypad, and a navigation wheel are placed onto a top surface of the inner core and within sidewalls of the main housing. A battery door is then slid into the second end of the main housing and over a bottom surface of the inner core assembly. Following such an assembly method ensures that only the battery door is removable and that the inner core assembly having the hardware and software components are not removable from the wireless mobile device.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for assembly of a wireless mobile device assembly having a main housing free from perforations, parting lines, or buttons. The main housing provides the user with a smooth feel along its outer surface while also simplifying manufacturability and assembly of the wireless mobile device assembly.

Figure 1:
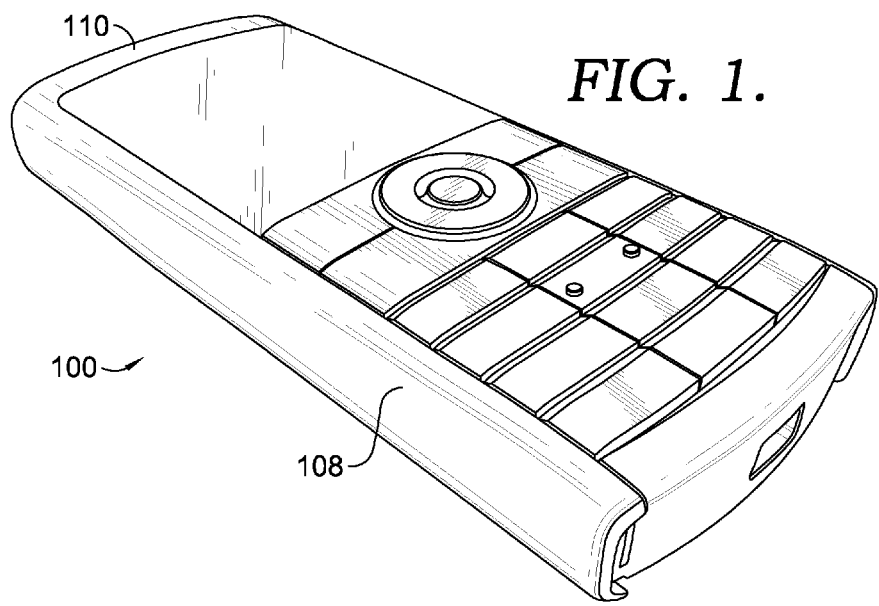
FIG. 1 depicts a perspective view of a wireless mobile device assembly in accordance with an embodiment of the present invention.

Referring to FIG. 1, a wireless mobile device assembly 100 is depicted in an assembled condition. The wireless mobile device depicted in FIG. 1 can be a wireless telephone, Personal Digital Assistant (PDA), navigation device, digital music player, or other portable monolith electronic device.

Figure 3:
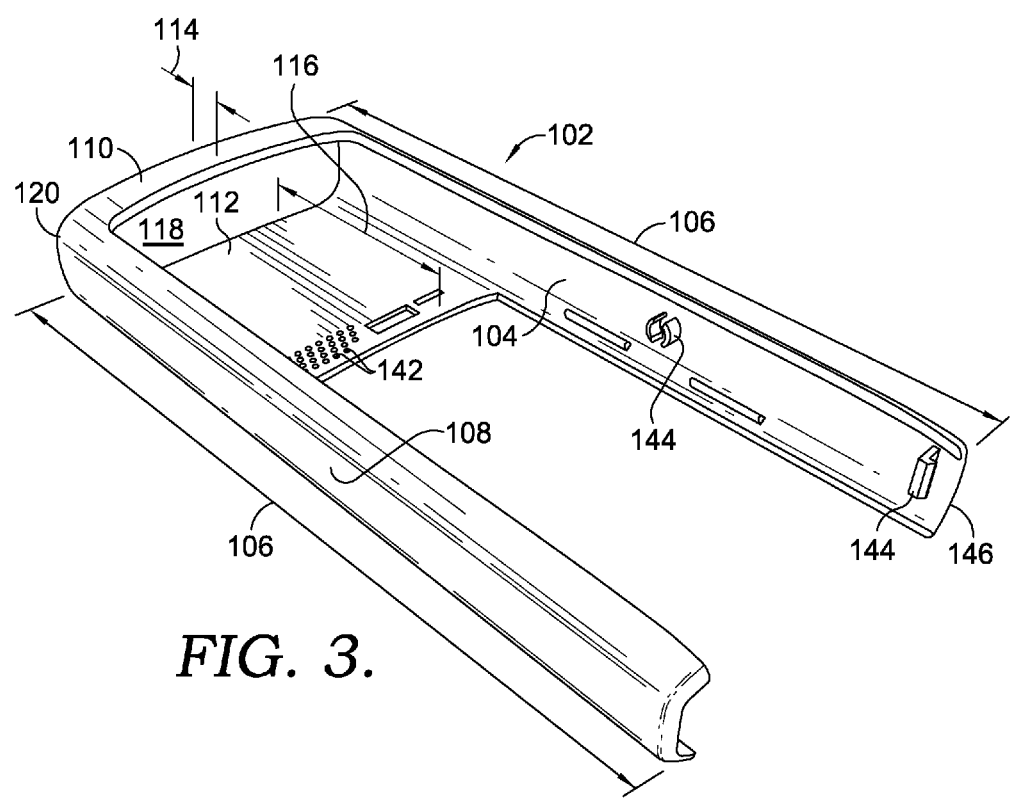
FIG. 3 depicts a perspective view of the main housing portion of the wireless mobile device assembly in accordance with an embodiment of the present invention; and, FIGS. 4-6 depict an assembly process for the wireless mobile device assembly in accordance with an embodiment of the present invention.
Figure 2:
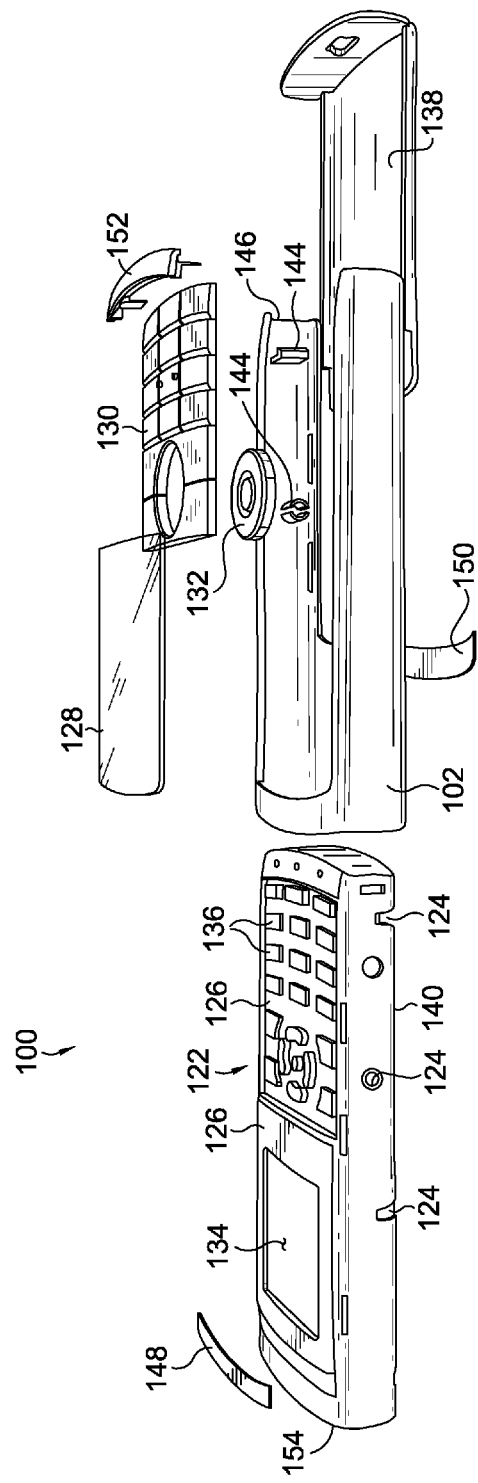
FIG. 2 depicts an exploded view of the wireless mobile device assembly of FIG. 1 in accordance with an embodiment of the present invention.

The wireless mobile device assembly 100, as can be seen in more detail in FIGS. 2 and 3, comprises a main housing 102 having a first generally channel-shaped sidewall 104 extending a length 106 and a second generally channel-shaped sidewall 108 extending the same length 106 and being generally parallel to the first generally channel-shaped sidewall 104. The two sidewalls 104 and 108 are coupled together by a first connecting member 110 and a second connecting member 112. The connecting members 110 and 112 are generally parallel and spaced a distance apart. The first connecting member 110 has a first connecting length 114 and the second connecting member 112 has a second connecting length 116, where in an embodiment of the present invention, the second connecting length 116 is greater than the first connecting length 114.

The main housing 102 also comprises an opening 118 that is formed at a first end 120 of the main housing 102. The opening 118 is a result of the first and second connecting members 110 and 112 joining the first generally channel-shaped sidewall 104 to the second generally channel-shaped sidewall 108.

As it can be seen from FIGS. 2 and 3, the main housing 102 does not have any joints where the sidewalls 104 and 108 and the connecting members 110 and 112 come together. Fabrication of the main housing 102 as a single component can be accomplished through injecting a high temperature liquefied plastic material into a mold of the desired shape and cooling the mold to a temperature at which the plastic material has solidified. Use of plastic in this arrangement provides a main housing portion of the wireless mobile device assembly with a smooth-looking appearance and feel that is free of parting lines along the sidewalls 104 and 108.

Referring now to FIG. 2, the wireless mobile device assembly 100 further comprises an inner core 122 that has one or more slots 124 located along sides 125 for slidably engaging with the main housing 102. The one or more slots 124 can be a variety of shapes as shown in FIG. 2. The inner core 122 contains one or more hardware and software components of the wireless mobile device assembly 100. Examples of these components include a memory card, a processor, and associated circuitry between the various electrical and mechanical components. Antenna components and ports to engage external devices, such as a power adapter are located at opposing ends on the inner core 122, at positions adjacent the first end 120 and second end 146 of the main housing 102.

The wireless mobile device assembly 100 also comprises one or more areas 126 for receiving external surface components such as a display lens 128, a keypad 130, and a navigation wheel 132. These one or more areas 126 are generally located along a front face of the inner core 122. Generally speaking the display lens 128 overlays a monitor component 134 and the keypad 130 overlays a plurality of buttons or pads 136. The navigation wheel for this embodiment is positioned adjacent the keypad 130. Located generally opposite of these external surface components is a door 138 that is removably coupled to the main housing 102. The door 138 accesses a battery compartment 140 in the inner core 122.

An alternate embodiment of the present invention is directed generally towards a housing component 102 of a wireless mobile device assembly 100. As it can be seen in FIG. 3, the housing component 102 comprises a first generally channel-shaped sidewall 104 that extends a length 106. A second generally channel-shaped sidewall 108 extends the length 106 and is generally parallel to the first generally channel-shaped sidewall 104.

The housing component 102 also comprises a first connecting member 110 that extends between the first and second sidewalls 104 and 108, respectively. The first connecting member 110 has a first connecting length 114. A second connecting member 112 also extends between the first and second sidewalls 104 and 108 and is generally parallel to the first connecting member 110. The second connecting member 112 has a second connecting length 116, which as can be seen in FIG. 3, is greater than the first connecting length 114. This is but one embodiment and in alternate embodiments, the first connecting length 114 can be equal to or greater than the second connecting length 116. The first and second generally channel-shaped sidewalls 104 and 108 and the first and second connecting members 110 and 112 together form an opening 118 at a first end 120 of the housing 102. In an embodiment of the present invention, the second connecting member 112 also has a plurality of apertures 142 through which sound waves associated with a speaker can pass.

The housing 102 further comprises one or more locking tabs 144 that are located within the first and second generally channel-shaped sidewalls 104 and 108. The locking tabs 144 are used for securing the housing 102 to one or more slots or openings 124 of an inner core 122 that is capable of sliding through the opening 118. The shapes, spacing, and size of the one or more locking tabs 144 will vary depending on the size of the wireless mobile device being assembled and material choice for the inner core 122 and housing 102. The assembly process will be discussed in further detail below.

The housing 102 is preferably fabricated from plastic, although a variety of materials could be used. Furthermore, as it can be seen in FIG. 3, the first and second connecting members 110 and 112 are integral with the first and second sidewalls 104 and 108. This provides a single, seamless component for use in the wireless mobile device assembly 100.

In yet another embodiment of the present invention, a method of assembling a wireless mobile device is disclosed. The components necessary to assemble the wireless mobile device 100 are depicted in an exploded view in FIG. 2 while further detailed assembly views are shown in FIGS. 4-6. The assembly steps for the wireless mobile device 100 of the present invention include providing an inner core assembly 122 having one or more hardware and software components for operation of the wireless mobile device 100 and directing the inner core assembly 122 through an opening 118 in a first end 120 of a main housing 102. The main housing 102 has a plurality of parallel and generally channel-shaped sidewalls 104 and 108, with each of the sidewalls having one or more locking tabs 144.

The inner core assembly 122, which has one or more slots 124 located along sides 125, is slid towards a second end 146 of the main housing 102. The movement of the inner core assembly 122 within the main housing 102 is best depicted in FIGS. 4-6, which, for clarity purposes shows a portion of the main housing 102 in cross section. As it can be seen from FIGS. 4 and 5, the inner core assembly 122 slides towards the second end 146 and the one or more locking tabs 144 of the main housing 102 generally slide along the sides 125 of the inner core assembly 122. This general motion continues until the one or more locking tabs 144 slides into a corresponding slot 124 in the inner core assembly 122, as depicted in FIG. 6. When the locking tabs 144 engage the slots 124, the inner core assembly 122 is locked into the main housing 102.

Other components such as a display lens 128, keypad 130, and a navigation wheel 132 are then placed onto a top surface of the inner core assembly 122, in one or more areas 126, which are within the first and second sidewalls 104 and 108. These components cover various electrical and mechanical components of the inner core assembly 122. Other components added to the wireless mobile device after the inner core assembly 122 has been locked into the main housing 102 can include an earpiece mesh 148, a speaker mesh 150, and a keypad snap 152 (see FIG. 3).

A sliding battery door 138 is placed into the second end 146 of the main housing 102 and over a bottom surface of the inner core assembly 122. The battery door 138 can be removed for installation and replacement of a battery (not shown) by sliding the door towards the second end 146 of the main housing 102. Based on the design of the main housing 102 and inner core assembly 122, the battery door 138 is the only component that can be removed post-assembly.

The assembly process may also include placing the battery in a compartment within the inner core assembly 122 prior to initially covering the compartment with the sliding battery door 138. However, installation of this battery may not be completed during assembly of the wireless mobile device due to concerns with product safety, transportation, storage, or battery drainage.

Upon completion of the wireless mobile device assembly, only a top surface 154 of the inner core assembly 122 is visible to the eye.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A wireless mobile device comprising:
 a main housing having:
  a first generally channel-shaped sidewall extending a length;

a second generally channel-shaped sidewall extending the length and being generally parallel to the first generally channel-shaped sidewall;

a first connecting member extending between the first and second generally channel-shaped sidewalls at a first end of the main housing and having a first connecting length; and, a second connecting member extending between the first and second sidewalls at the first end of the main housing and having a second connecting length, the second connecting member generally parallel to and spaced a distance from the first connecting member;

wherein the first and second generally channel-shaped sidewalls and the first and second connecting members are positioned so as to form an opening at the first end of the main housing and adjacent to the first and second connecting members;

an inner core sized to pass through the opening and having one or more slots therein for slidably engaging the main housing;

one or more areas for receiving a display lens, a keypad, and a navigation wheel; and, a door positioned generally opposite of the one or more areas.

2. The wireless mobile device of claim 1, wherein the keypad overlays onto a portion of the inner core.

3. The wireless mobile device of claim 1, wherein the door is removably coupled to the main housing.

4. The wireless mobile device of claim 3, wherein the door accesses a battery compartment in the inner core.

5. The wireless mobile device of claim 1 being a portable phone, navigation device, or personal digital assistant.

6. The wireless mobile device of claim 5, wherein the inner core contains one or more hardware and software components of the portable phone, navigation device, or personal digital assistant.

7. The wireless mobile device of claim 1, wherein the second connecting length is greater than the first connecting length.

8. The wireless mobile device of claim 1, wherein the main housing is fabricated as a single plastic component.

9. A housing component of a wireless mobile device comprising:

a first generally channel-shaped sidewall extending a length;

a second generally channel-shaped sidewall extending the length and being generally parallel to the first generally channel-shaped sidewall;

a first connecting member extending between the first and second sidewalls at a first end of the housing and having a first connecting length;

a second connecting member extending between the first and second sidewalls at the first end of the housing and having a second connecting length, the second connecting member generally parallel to and spaced a distance from the first connecting member; and, one or more locking tabs located within and proximate a second end of the first and second generally channel-shaped sidewalls for preventing movement of the inner core component relative to the housing component;

wherein the first and second generally channel-shaped sidewalls and the first and second connecting members are positioned so as to form an opening at the first end of the housing and adjacent to the first and second connecting members.

10. The housing of claim 9, wherein the inner core component is capable of sliding into the housing through the opening.

11. The housing of claim 9, wherein the housing is fabricated from plastic.

12. The housing of claim 11, wherein the housing is a single, seamless component.

13. The housing of claim 9, wherein a plurality of apertures are located in the second connecting member through which sound waves from the inner core pass.

14. The housing of claim 9, wherein the second connecting length is greater than the first connecting length and the first connecting member is generally parallel to the second connecting member.

15. A method of assembling a wireless mobile device comprising:

providing an inner core assembly having one or more hardware and software components for operation of the wireless mobile device;

directing the inner core assembly through a first opening in a first end of a main housing, the first opening formed by parallel sidewall members connected to parallel connecting members at a first end of the main housing;

sliding the inner core assembly towards a second end of the main housing;

locking the inner core assembly into the main housing by way of a plurality of locking tabs extending inward from the main housing;

placing a display lens, a keypad, and a navigation wheel onto a top surface of the inner core and within sidewalls of the main housing; and, sliding a battery door into a second end of the main housing and over a bottom surface of the inner core assembly;

wherein locking the inner core assembly into the main housing prevents axial, translational, and rotational movement of the inner core assembly relative to the main housing.

16. The method of claim 15 further comprising placing a battery into a compartment of the inner core assembly prior to sliding the battery door into the second end of the main housing.

17. The method of claim 15, wherein the main housing has a plurality of parallel and generally channel-shaped sidewalls, each of the sidewalls having one or more locking tabs.

18. The method of claim 17, wherein the inner core assembly is a plastic component containing one or more slots for receiving the one or more locking tabs of the main housing.

19. The method of claim 15, wherein only the battery door can be separated from the wireless mobile device.

* * * * *